(12) United States Patent
Köhler et al.

(10) Patent No.: US 12,034,261 B2
(45) Date of Patent: Jul. 9, 2024

(54) METHOD FOR CONNECTING TWO CONDUCTORS COMPOSED OF DIFFERENT MATERIALS AND CONNECTOR AND SYSTEM THEREFOR

(71) Applicant: Wobben Properties GmbH, Aurich (DE)

(72) Inventors: Jan-Phillip Köhler, Ihlow (DE); Arne Willms, Wittmund (DE)

(73) Assignee: Wobben Properties GmbH, Aurich (DE)

( * ) Notice: Subject to any disclaimer, the term of this patent is extended or adjusted under 35 U.S.C. 154(b) by 955 days.

(21) Appl. No.: 17/040,854

(22) PCT Filed: Mar. 14, 2019

(86) PCT No.: PCT/EP2019/056390
§ 371 (c)(1),
(2) Date: Sep. 23, 2020

(87) PCT Pub. No.: WO2019/185358
PCT Pub. Date: Oct. 3, 2019

(65) Prior Publication Data
US 2021/0021060 A1     Jan. 21, 2021

(30) Foreign Application Priority Data
Mar. 28, 2018    (DE) .................... 10 2018 107 485.9

(51) Int. Cl.
*H01R 4/62*    (2006.01)
*F03D 9/25*    (2016.01)
(Continued)

(52) U.S. Cl.
CPC ............... *H01R 4/62* (2013.01); *F03D 9/255* (2017.02); *H01B 1/023* (2013.01); *H01B 1/026* (2013.01); *H01R 4/02* (2013.01); *H01R 13/03* (2013.01)

(58) Field of Classification Search
CPC .......... H01R 13/03; H01R 4/62; H01R 4/625; H01R 4/02; H01R 11/12; F03D 9/255; H01B 1/023; H01B 1/026
(Continued)

(56) References Cited

U.S. PATENT DOCUMENTS 3,912,358 A * 10/1975 Miller ...................... H01R 4/62
439/877
4,290,665 A    9/1981 Krasnov et al.
(Continued)

FOREIGN PATENT DOCUMENTS

CN    104283017 A    1/2015
CN    105932433 A    9/2016
(Continued)

OTHER PUBLICATIONS

WO-2017090552-A1 with translation (Year: 2017).*

*Primary Examiner* — Marcus E Harcum
(74) *Attorney, Agent, or Firm* — Seed IP Law Group LLP

(57) ABSTRACT

A method of electrically connecting a first conductor composed of a first material, preferably aluminum, to a second conductor comprising or composed of a second material different from the first material, preferably copper, with a connector. For that purpose a connector precursor is provided, which includes a conductor core composed of the first material and sheathed by a casing layer composed of another material. The connector precursor has a first end and a second end. According to the method the casing layer is removed in the region of the first end to provide a contact surface. The first conductor is then connected to the first end (Continued)

in the region of the contact surface and the second conductor is connected to the second end of the connector. A connector and a system are also provided.

15 Claims, 4 Drawing Sheets

(51) Int. Cl.
*H01B 1/02* (2006.01)
*H01R 4/02* (2006.01)
*H01R 13/03* (2006.01)

(58) Field of Classification Search
USPC .................................................. 439/887, 888
See application file for complete search history.

(56) References Cited

U.S. PATENT DOCUMENTS

| | | | | |
|---|---|---|---|---|
| 4,315,175 A * | 2/1982 | Hamilton | ............... | H01R 4/029 228/115 |
| 5,804,770 A * | 9/1998 | Tanaka | ............... | H01M 50/591 174/138 F |
| 6,322,376 B1 * | 11/2001 | Jetton | ............... | H01R 4/302 411/107 |
| 6,918,800 B2 * | 7/2005 | Ota | ............... | H01R 13/03 439/886 |
| 8,747,170 B2 * | 6/2014 | Cornelius | ............... | H01R 13/6215 439/810 |
| 9,054,435 B2 * | 6/2015 | Petrucci | ............... | H01R 13/03 |
| 9,083,089 B2 | 7/2015 | Petrucci et al. | | |
| 9,184,541 B2 * | 11/2015 | Miyamoto | ............. | H01R 4/206 |
| 9,711,875 B2 * | 7/2017 | Ooba | ............. | H01R 4/184 |
| 9,887,477 B1 * | 2/2018 | Reed | ............. | H01R 43/16 |
| 10,283,888 B2 * | 5/2019 | Dören | ............. | H01R 13/03 |
| 11,450,975 B2 * | 9/2022 | Wang | ............. | H01R 4/62 |
| 2002/0053458 A1 * | 5/2002 | Kondo | ............. | H01R 11/12 174/84 C |
| 2011/0294368 A1 * | 12/2011 | Nakata | ............. | H01R 4/184 439/887 |
| 2012/0292912 A1 * | 11/2012 | Haskell | ............. | F03D 9/46 290/55 |
| 2013/0240264 A1 | 9/2013 | Barezzani | | |
| 2016/0028177 A1 * | 1/2016 | Nomura | ............. | H01R 43/16 428/626 |
| 2016/0276758 A1 * | 9/2016 | Warashina | ............. | A47B 39/00 |
| 2017/0179664 A1 * | 6/2017 | Miyakawa | ............. | H01R 4/185 |
| 2017/0298493 A1 * | 10/2017 | Mennucci | ............. | B23K 20/02 |
| 2019/0140505 A1 | 5/2019 | Röer | | |

FOREIGN PATENT DOCUMENTS

| | | | | |
|---|---|---|---|---|
| GB | 1331468 A | 9/1973 | | |
| JP | 2010257843 A | 11/2010 | | |
| WO | WO-2017090552 A1 * | 6/2017 | ............... | H01R 4/02 |
| WO | 2017/186644 A1 | 11/2017 | | |

* cited by examiner

METHOD FOR CONNECTING TWO CONDUCTORS COMPOSED OF DIFFERENT MATERIALS AND CONNECTOR AND SYSTEM THEREFOR

BACKGROUND

Technical Field

The invention concerns electrically connecting two electrical conductors composed of different materials.

Description of the Related Art

Electrical conductors of copper are predominantly used in the state of the art as they have particularly advantageous electrical properties. Increasingly however aluminum is also being used for the electrical line as it is more convenient than copper and is also lower in weight.

It is admittedly known that a greater line cross-section of an aluminum conductor in comparison with a copper conductor is necessary to achieve a comparable specific resistance. Nonetheless aluminum is being more and more frequently used as a conductor, in particular in special areas of use as, in spite of a greater conductor cross-section of an electrical conductor with the same specific resistance as a copper conductor the aluminum conductor is lighter by comparison.

By way of example in the area of wind turbines in which a generator has to be fitted at a great height above the surface of the ground and for that purpose has to be lifted with a crane the use of aluminum for example is advantageous for the generator windings. That advantage arises for example out of the comparatively lower demands made on a lifting crane for lifting the generator for fitting it in place or also due to the comparatively lower demands on a structure of a tower of the wind turbine which later in use carries the generator.

By virtue of the large number of windings in a wind turbine generator, to continue with that example, the coils however are electrically connected by way of copper lines as copper for example is not as brittle as aluminum and is therefore more suitable for withstanding vibrations. In addition the comparatively greater weight in the case of copper lines is accepted in order to more easily electrically connect the generator coils in the tight connecting compartment to be found in a generator.

By virtue of the combined use of different materials for carrying a current therefore connections of the conductors composed of different materials are necessary, which are very difficult and in part complicated and expensive to manufacture. Frequently for example such connections are nowadays made purely mechanically, for example by crimp connectors.

Connections made by means of crimp connectors are however in part unreliable as generally they cannot be fitted by an automated procedure and therefore are fitted individually and even by different personnel. That results in fluctuations in the quality of the connection depending on the respective pressure applied or the arrangement involved. It is therefore not possible to ensure a uniformly deterministic electrical connection. That effect for example is still further increased by virtue of the fact that, in the case of electrical contact which for example decreases with temperature, a current in the region which by comparison is still contacted can lead to a further increase in temperature so that an electrical connection overall can overheat and in that case can be damaged. Particularly when using aluminum as one of the connection components there is also the risk of oxidation of the aluminum so that mechanical connections involving aluminum can be defective.

Alternatively welding methods between aluminum and copper are known, which however are difficult to carry out and are also susceptible to faults.

On the application from which the present application claims priority the German Patent and Trade Mark Office searched the following state of the art: CN 105932433 A and US 2013/0240264 A1.

BRIEF SUMMARY

One or more embodiments are directed to electrically connecting two electrical conductors composed of different materials generally, and more specifically connecting aluminum form-wound coils with copper lines for electrically connecting the coil Provided herein is connecting two conductors of different materials together easily and reliably so that the flow of current through the connection is provided, in particular, even when vibrations or temperature variations are involved.

In that respect, provided is a method of electrically connecting a first conductor composed of a first material, preferably aluminum, to a second conductor comprising or composed of a second material, preferably copper, wherein the second material is different from the first material. The electrical connection can also be referred to as a conductive connection.

The method firstly includes the provision of a connector precursor comprising a conductor core of a first material, wherein the conductor core of the connector precursor is sheathed with a casing layer composed of a material different from the first material, in particular being the second material. Preferably the casing layer of the connector precursor is applied to the conductor core by plating or pressing.

The casing layer is applied to the conductor core, in particular in a previous production step for the connector precursor, in such a way that penetration or the presence of oxygen in a transitional region between the conductor core and the casing layer is substantially prevented. By way of example it would also be possible to provide a substance-to-substance bonding connection between the conductor core and the casing layer.

The connection between the conductor core and the conductor casing without oxygen in the connecting region makes it possible to prevent the conductor core from oxidizing. Accordingly, if the conductor core comprises aluminum and the casing layer comprises copper, it is thus possible to ensure that an electrical connection between the conductor core and the casing layer is not interrupted by the formation of an oxide layer.

The connector precursor has a first end. To prepare or produce the connector the casing layer is at least partially removed in the region of the first end of the connector precursor to prepare a contact surface for the connection, in particular electrical connection, to a first conductor at the first material. Accordingly to provide the contact surface the material of the casing layer is removed to such an extent that the first material provides the contact surface.

In addition the method includes connection of the first conductor consisting of the first material to the contact surface so that this gives an electrical connection, and connection of the second conductor to a second end of the conductor, that is opposite to the first end. The second conductor is accordingly connected to the second end in particular in such a way that the second conductor is electrically contacted or connected to the casing layer.

With the connecting method using the connector it is easily possible for two conductors to be electrically, that is to say electrically conductively, connected together even if they consist of or include different materials. That becomes possible by virtue of the particular design configuration of the connector, by the preparation of the connector precursor and by the processing thereof for producing the connector.

In particular it has been found advantageous that the connections of the different materials are already produced by the connector precursor itself and therefore can be produced separately by pre-processing, that is to say previous production, irrespective of temperature limits or spatial limitations, without oxide layers influencing an electrical connection between the two materials.

According to an embodiment, connection of the conductor consisting of the first material to the contact surface is effected by a joining method. Suitable joining methods are, for example, welding, preferably WIG welding, or soldering, in particular brazing using a shaping portion. Alternatively or additionally, connection of the first conductor consisting of the first material is effected by a pressing method, in particular pressing connection or pressing welding.

Accordingly, the contact surface which provides a surface consisting of the first material can be particularly easily connected to the first conductor which consists of the same material. A further advantage is that an oxide layer on the first conductor and/or the conductor core in the region of the contact surface is broken up by such connecting methods and thus cannot prevent a defect-free electrical connection.

According to a further embodiment for connecting the first conductor, an aperture is provided through the connector in the region of the contact surface, that is to say in the region of the first end. The aperture preferably involves an opening geometry or cross-sectional shape which corresponds to the cross-sectional geometry or cross-sectional shape of a first conductor to be connected, or at least substantially corresponds thereto. For connecting the first conductor the first conductor is introduced through the aperture at the first end.

After introduction, the first conductor is connected to the connector, preferably by a joining method, or a pressing method.

This, therefore, ensures that the connector is particularly securely held to the first conductor.

According to a further embodiment for connecting the second conductor to the connector, an aperture is produced through the connector in the region of the second end of the connector, that is opposite to the first end. The aperture is preferably introduced into the connector by boring or drilling. The second conductor is then connected to the connector by a screw connection. Preferably for that purpose the second conductor also has an aperture or a bore. The aperture in the second conductor is provided, for example, by a cable shoe which preferably has on the opposite side to the aperture a press connector for connection to a cable or a stranded wire of the second conductor or directly by the second conductor.

Contacting between the second conductor, which, for example, includes the same material as the casing layer of the conductor, is accordingly ensured by a simple screw connection. For example, the second conductor includes copper which is galvanized. The connector includes a casing layer, which also comprises copper which can also be galvanized.

A screw connection between the second conductor and the connector is further advantageous as for example the connector can be connected to the first conductor in a pre-processing step, in which case that is effected by welding, and then later upon final assembly even in a constricted structural space a connection can be produced between the second conductor and the connector and thus also the first conductor.

According to a further embodiment, the aperture at the second end is in the form of a bore so that the second conductor is secured through the bore on the connector by means of a screw and a nut. Alternatively, the aperture at the second end of the connector is produced by a bore with the incorporation of a thread therein. Simply screwing a screw in for connecting the second conductor to the bore at the second end is therefore possible.

Accordingly, a releasable connection is made possible between the second conductor and the connector and, thus, also the first conductor. In that way, in the event of a defect, to replace conductors the connection can be easily released again without damage.

In a further embodiment, removal of the casing layer of the conductor is effected by a cutting method. A firm material connection between the two materials of the connector can, thus, be precisely severed and the casing layer can be removed in accordance with a predetermined geometry to provide the contact surface.

In that case it is easily possible to take account of the fact that as little conductor core as possible consisting of the first material is removed.

Provided is a connector for connecting a first conductor consisting of a first material, which is preferably aluminum, to a second conductor including or consisting of a second material, which is preferably copper.

The connector includes a conductor core consisting of the first material, which is preferably aluminum. In addition the connector includes a casing layer, which sheaths the conductor core. The casing layer consists of a material, which is different from the first material and which is preferably the second material and particularly preferably copper.

In the case of the connector, the casing layer is removed in the region of a first end of the connector to provide a contact surface for connection to the first conductor consisting of the first material.

In a preferred embodiment, the connector is in the form of a straight flat bar, where according to an alternative configuration the connector is bent or deformed to adapt it for a use.

According to an embodiment, the first conductor has an aperture through the connector in the region of the contact surface. The aperture preferably involves an opening geometry or cross-sectional shape which corresponds or at least substantially corresponds to the cross-sectional geometry or cross-sectional shape of the first conductor to be connected.

For connecting the first conductor in that way the first conductor can be introduced through the aperture at the first end so that this gives a firm connection.

According to an embodiment, the connector at a second end opposite to the first end has an aperture, in particular a bore, where the aperture preferably includes a thread, in particular a female thread.

Accordingly, this provides a releasable connection between the second conductor and the connector and thus also indirectly the first conductor.

According to an embodiment, the casing layer is applied to the conductor core of the connector by plating or pressing. A firm material-bonded connection between the casing layer and the conductor core is produced in that way.

In a further embodiment, the casing layer is removed in the region of the first end to provide the contact surface by a cutting method.

Provided is a system, which in particular is a wind turbine.

The system includes a connector according to one of the above-described embodiments as well as a first conductor which is electrically or conductively connected to the connector. Further included is a second conductor which is also electrically or conductively connected to the connector.

According to an embodiment of the system, the first conductor is an aluminum conductor which is a form-wound coil. A form-wound coil is a pre-formed coil. The coil accordingly has two ends and a plurality of windings formed between the ends by the first conductor. One end of the form-wound coil is accordingly connected to the connector.

According to a further embodiment, the second conductor is a copper conductor, namely a copper cable or in particular a copper braided cable, preferably with a cable shoe which is fitted on to an end of the copper cable or the copper braided cable and which preferably also consists of copper which is galvanized.

According to a further configuration, the system includes a wind turbine generator having a plurality of connectors. Each connector is respectively connected to a first conductor which is an aluminum form-wound coil.

BRIEF DESCRIPTION OF THE SEVERAL VIEWS OF THE DRAWINGS

Further configurations will be set forth by reference to the embodiments by way of example which are described in greater detail in the Figures in which.

DETAILED DESCRIPTION

Figure 1:
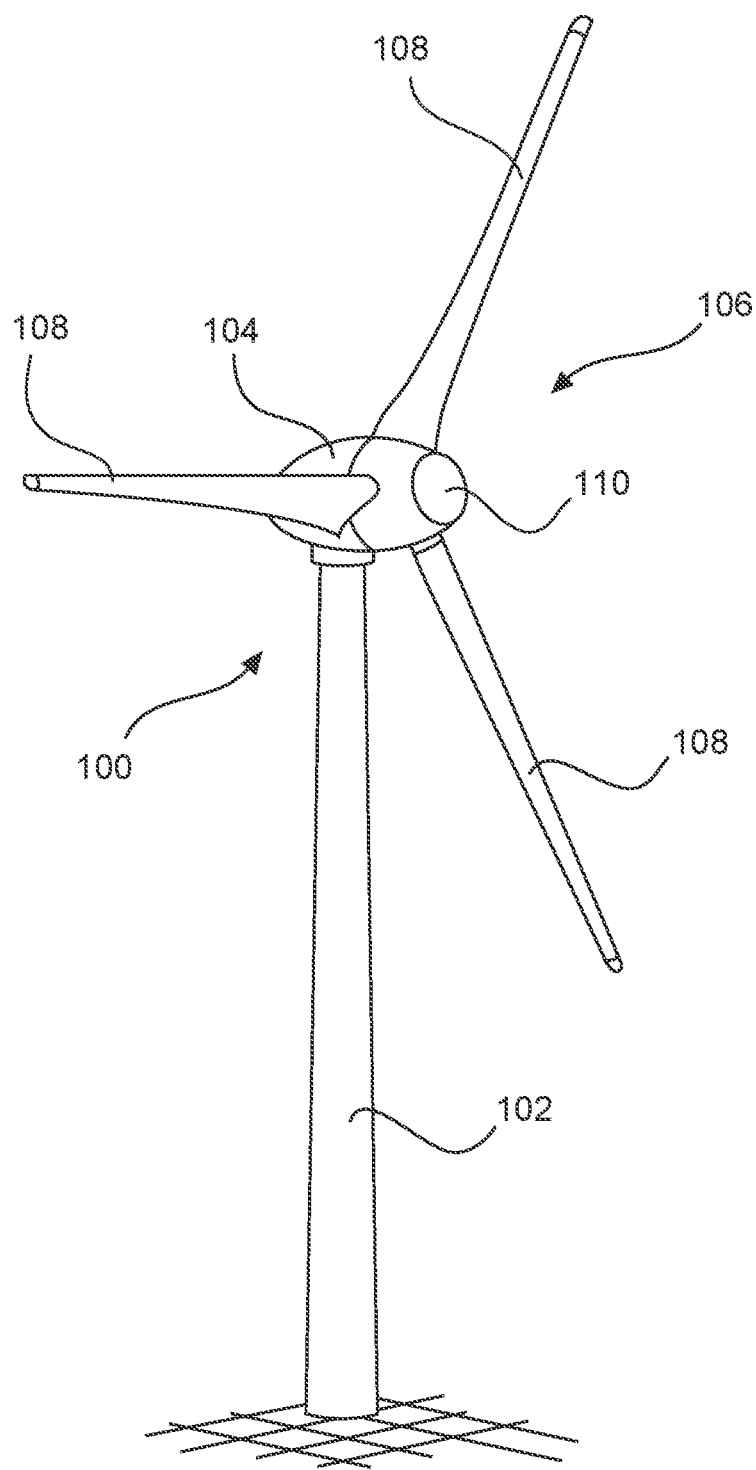
FIG. 1 shows a wind turbine.

FIG. 1 shows a diagrammatic view of a system which is a wind turbine 100 according to an embodiment. The wind turbine 100 has a tower 102 and a nacelle 104 on the tower 102. Provided on the nacelle 104 is an aerodynamic rotor 106 having three rotor blades 108 and a spinner 110.

In operation of the wind turbine the aerodynamic rotor 106 is driven in a rotary movement by the wind and thus also rotates an electrodynamic rotor or rotor member of a generator coupled directly or indirectly to the aerodynamic rotor 106. The electric generator is arranged in the nacelle 104 and generates electric power. The pitch angles of the rotor blades 108 can be altered by pitch motors at the rotor blade roots of the respective rotor blades 108.

Figure 2:
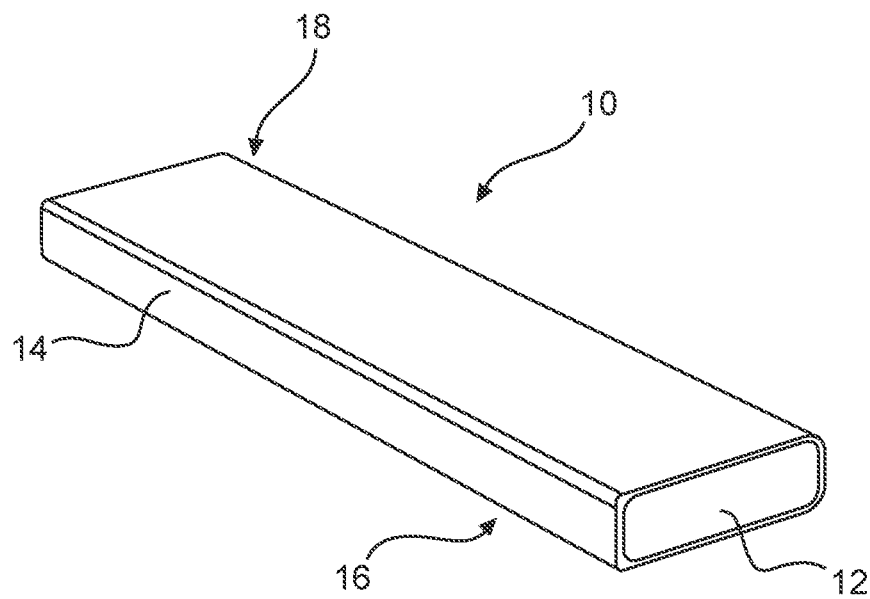
FIG. 2 shows a connector precursor for producing a connector.

FIG. 2 shows a diagrammatic view of a connector precursor 10 having a conductor core 12 composed of a first material which is aluminum. The conductor core 12 is sheathed by a casing layer 14 consisting of copper. The conductor core 12 and the casing layer 14 are fixedly connected together by a pressing method. The connector precursor 10 has a first end 16 and a second end 18 opposite the first end 16.

Figure 3:
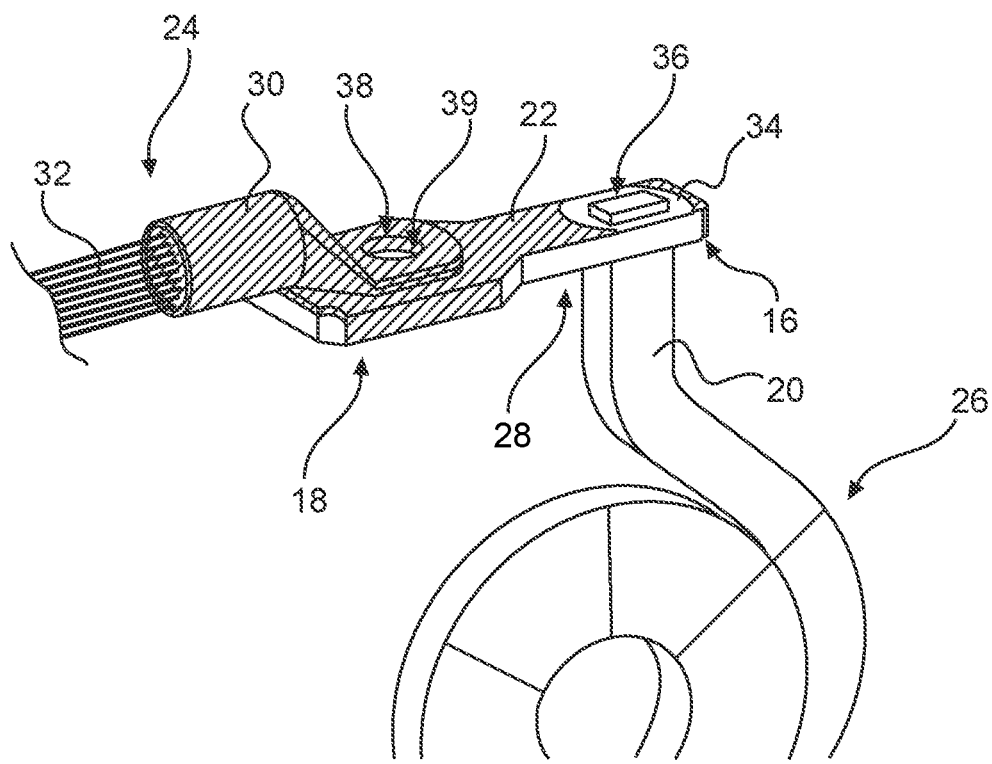
FIG. 3 shows two conductors connected by a connector.

FIG. 3 diagrammatically shows a first conductor 20 connected to a second conductor 24 by way of a connector 22. The connector 22 has been produced from the connector precursor 10 by removal of the casing layer 14 at the first end 16.

The first conductor 20 is diagrammatically shown here in the form of a form-wound coil 26 having a coil end 28. The connector 22 is connected at its first end 16 to the coil end 28 of the first conductor 20. For that purpose the casing layer 14 has been removed from the connector precursor 10 at the first end 16 of the connector so that this provides a contact surface 34 with the aluminum. Provided within the contact surface 34 is an aperture 36 through which the coil end 28 is passed. The coil end 28 is then connected to the connector 22 by a joining method in the region of the contact surface 34.

The second conductor 24 includes a cable shoe 30 which is pressed on to a copper cable 32. The cable shoe also substantially comprises copper which is galvanized. At the second end 18 of the connector, that is opposite the first end 16, the connector also has an aperture 38. Arranged above the aperture 38 is the cable shoe 30 which also has an aperture 39. For connecting the cable shoe 30 to the connector 22, a screw is passed jointly through both apertures 38, 39 and screwed in place.

Figure 4:
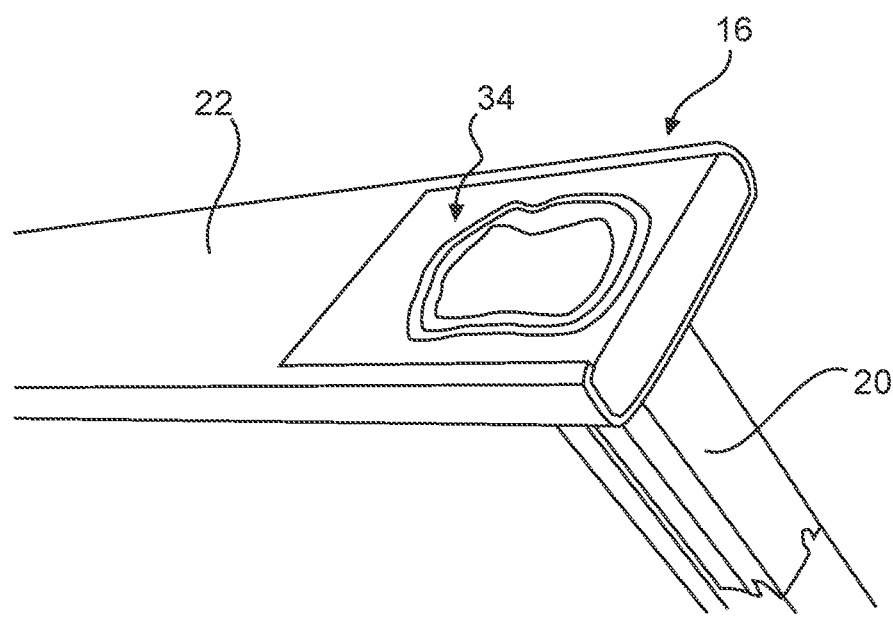
FIG. 4 shows a connection of a first conductor to the connector.

FIG. 4 shows an enlarged view of the first end 16 of the connector 22 which is connected to a first conductor 20 by a welded connection.

Figure 5:
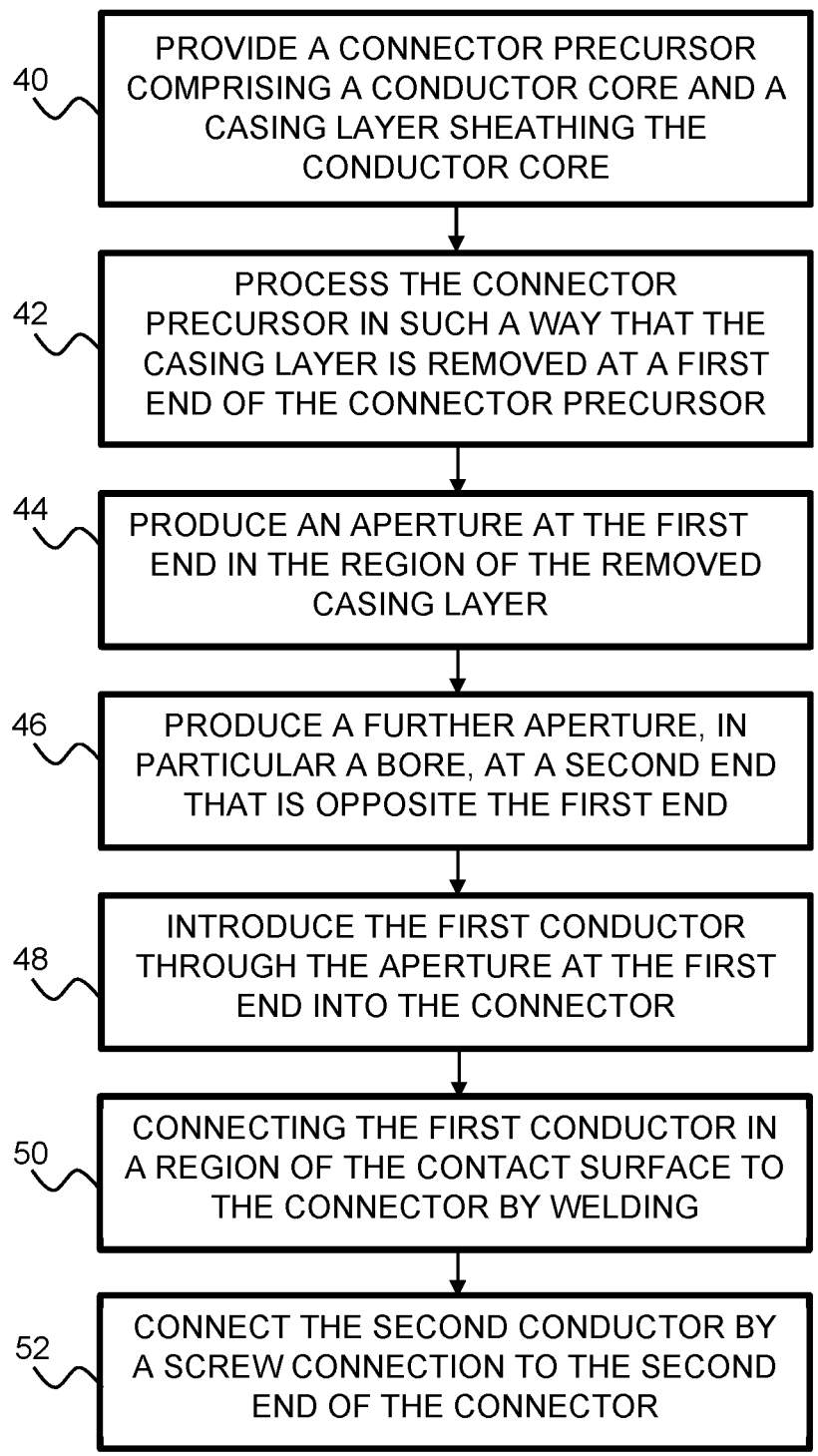
FIG. 5 shows the steps for connecting two conductors.

FIG. 5 shows the steps in a method of connecting a first conductor 20 to a second conductor 24 by a connector 22 according to an embodiment. Provided in a step 40 is a connector precursor 10 comprising a conductor core 12 and a casing layer 14 sheathing the conductor core. The connector precursor 10 is then processed in a step 42 in such a way that the casing layer 14 is removed at a first end 16 of the connector precursor 10.

In a step 44 an aperture 36 is then produced at the first end in the region of the removed casing layer 14 and in step 46 a further aperture 38, in particular a bore, is then produced at the second end 18 that is opposite the first end 16. In step 48 the first conductor 20 is introduced through the aperture 38 at the first end 16 into the connector 22 while in step 50 it is connected in the region of the contact surface 34 to the connector 22 by welding. In step 52 the second conductor 24 is then connected by a screw connection to the second end 18 of the connector 22.

The invention claimed is:

1. A method of electrically connecting a first conductor of a first material to a second conductor of a second material different from the first material with a connector, comprising:

preparing a connector precursor including a conductor core of the first material that is sheathed by a casing layer of a material different from the first material, wherein the connector precursor has a first end and a second end;

removing the casing layer in a region of the first end to expose a contact surface;

introducing an aperture into the second end of the connector for connecting the second conductor;

connecting the first conductor to the first end in a region of the contact surface; and connecting the second conductor to the second end, wherein the aperture is a bore and the connection between the second conductor and the connector is produced by a screw connection in which a screw is secured with a nut, or the aperture has a bore having a thread and the second conductor is secured with the screw by the screw connection in the thread,
wherein the material of the casing layer that is different than the first material is the second material, and
wherein the first material is aluminum and the second material is copper.

2. The method according to claim 1, wherein connecting the first conductor to the first end includes joining the first conductor and the first end using a joining method, including at least one of welding, WIG welding, soldering or brazing, or a pressing method, including at least one of pressing connection or pressing welding, to produce an electrical connection.

3. The method according to claim 1, wherein to connect the first conductor to the connector, an aperture is provided at the first end in the region of the contact surface and the first conductor is at least partially introduced into or passed through the aperture at the first end.

4. The method according to claim 1 wherein removing the casing layer includes performing a cutting method.

5. A connector for connecting a first conductor of a first material that is aluminum to a second conductor of a second material that is copper, comprising:
a core of the first material; and
a casing layer, of the second material, sheathing the core, wherein the casing layer is removed in a region of a first end of the connector to provide a contact surface for connection to the first conductor, and
wherein arranged at a second end opposite to the first end is an aperture that is a bore through the connector,
wherein the connector and the first conductor are configured such that a connection between the second conductor and the connector is produced by a screw connection in which a screw is secured with a nut, or the aperture has a bore having a thread and the second conductor is configured to be secured with the screw by the screw connection in the thread.

6. The connector according to claim 5 wherein at the first end in a region of the contact surface, the connector has an aperture having an opening geometry substantially corresponding to a cross-sectional geometry of the first conductor.

7. The connector according to claim 5, wherein the aperture at the second end has a thread.

8. The connector according to claim 5 wherein the casing layer is applied to the core by at least one of plating or pressing such that a presence of or penetration of oxygen in a transitional region between the core and the casing layer is mitigated.

9. The connector according to claim 5 wherein the casing layer is removed by a cutting method.

10. A wind turbine, comprising:
the connector according to claim 5;
the first conductor connected to the first end of the connector; and
a second conductor connected to a second end of the connector.

11. The wind turbine according to claim 10 wherein the first conductor is an aluminum form-wound coil.

12. The wind turbine according to claim 10 wherein the second conductor includes a copper cable that is a copper braided cable or a copper cable shoe.

13. The wind turbine according to claim 10, comprising:
a wind turbine generator including a plurality of connectors which are respectively connected to a form-wound coil of the wind turbine generator.

14. The method according to claim 3, wherein the aperture of the first end has an opening geometry which at least substantially corresponds to a cross-sectional geometry of the first conductor.

15. The connector according to claim 14, wherein the aperture has a thread.

* * * * *